United States Patent

Nakamura

[11] Patent Number: 6,039,665
[45] Date of Patent: Mar. 21, 2000

[54] MULTIPLE SPROCKET ASSEMBLY FOR A BICYCLE

[75] Inventor: Yasushi Nakamura, Itami, Japan

[73] Assignee: Shimano, Inc., Osaka, Japan

[21] Appl. No.: 09/262,139

[22] Filed: Mar. 3, 1999

Related U.S. Application Data

[62] Division of application No. 08/770,498, Dec. 20, 1996, Pat. No. 5,954,604.

[51] Int. Cl.$^7$ .............................. F16H 7/06; F16H 55/30
[52] U.S. Cl. ........................................... 474/157; 474/160
[58] Field of Search ................................ 474/148, 150, 474/152–153, 158, 160, 202, 206, 212, 155, 157

[56] References Cited

U.S. PATENT DOCUMENTS

| | | | |
|---|---|---|---|
| 1,090,380 | 3/1914 | Brampton et al. | 474/231 |
| 1,634,642 | 7/1927 | Bens | 474/91 |
| 2,722,843 | 11/1955 | Edwards | 74/250 |
| 3,495,468 | 2/1970 | Griffel | 74/229 |
| 3,835,721 | 9/1974 | Hoffstetter | 74/245 R |
| 4,102,216 | 7/1978 | Nagano | 74/245 R |
| 4,121,474 | 10/1978 | Arregui Suinaga | 74/217 B |
| 4,741,725 | 5/1988 | Ingold | 474/212 |
| 4,889,521 | 12/1989 | Nagano | 474/164 |
| 5,205,794 | 4/1993 | Browning | 474/160 |
| 5,288,278 | 2/1994 | Nagano | 474/228 |
| 5,292,286 | 3/1994 | Lan | 474/73 |
| 5,362,278 | 11/1994 | Bergles et al. | 474/69 |
| 5,464,374 | 11/1995 | Mott | 474/224 |
| 5,569,107 | 10/1996 | Mu | 474/160 |

FOREIGN PATENT DOCUMENTS

| | | |
|---|---|---|
| 47927 | 3/1982 | European Pat. Off. . |
| 316239 A1 | 5/1989 | European Pat. Off. . |
| 510371 A1 | 10/1992 | European Pat. Off. . |
| 561380 A1 | 9/1993 | European Pat. Off. . |
| 844414 | 5/1998 | European Pat. Off. . |
| 707519 | 7/1931 | France . |
| 771741 | 10/1934 | France . |
| 2337076 | 7/1977 | France . |
| 2720367 | 12/1995 | France . |
| 4038009 A1 | 6/1992 | Germany . |
| 55-178490 | 12/1980 | Japan . |
| 60-69348 | 4/1985 | Japan . |
| 19121 | of 1896 | United Kingdom . |
| 20011 | of 1896 | United Kingdom . |
| 23067 | of 1898 | United Kingdom . |
| 15941 | of 1916 | United Kingdom . |
| 735919 | 8/1955 | United Kingdom . |
| 1572706 | 7/1980 | United Kingdom . |
| 2289507 | 11/1995 | United Kingdom . |

*Primary Examiner*—David A. Bucci
*Assistant Examiner*—Matthew A. Kaness
*Attorney, Agent, or Firm*—James A. Deland

[57] ABSTRACT

A plurality of sprockets are coaxially mounted together, wherein a spacing between each pair of adjacent sprockets is less than a thickness of at least one of the plurality of sprockets. In another embodiment of the invention, a plurality of sprockets are coaxially mounted together, wherein a spacing between each pair of adjacent sprockets is less than or equal to approximately 2.0 millimeters. In yet a further embodiment of the present invention, at least ten sprockets are coaxially mounted together to form a first free side sprocket surface facing laterally outwardly and a second free side sprocket surface facing laterally inwardly. A spacing between the first free side sprocket surface and the second free side sprocket surface is less than or equal to approximately 50 millimeters.

16 Claims, 7 Drawing Sheets

MULTIPLE SPROCKET ASSEMBLY FOR A BICYCLE

CROSS REFERENCE TO RELATED APPLICATIONS

This application is a division of application Ser. No. 08/770,498, filed Dec. 20, 1996, now U.S. Pat. No. 5,954,604.

BACKGROUND OF THE INVENTION

The present invention is directed to bicycle drive mechanisms and, more particularly, to a multiple sprocket assembly for a bicycle which includes a large number of freewheel sprockets.

FIG. 1 is a diagram illustrating a typical bicycle chain drive mechanism. As shown in FIG. 1, crank arms 1 having pedals 3 are rotatably coupled to a bicycle frame 2. A chainwheel assembly C comprising a plurality of sprockets, for example, C1 and C2, are connected to crank arms 1 so that rotating pedals 3 in a circular manner causes sprockets C1 and C2 to rotate together with crank arms 1. A freewheel assembly F comprising a plurality of sprockets F1, F2, etc. are mounted to the rear wheel of the bicycle (not shown), and a chain 4 selectively engages one of the chainwheel sprockets and one of the freewheel sprockets. A front derailleur 5 having a chain guide 6 is provided to switch the chain among the plurality of chainwheel sprockets, and a rear derailleur 7 having a guide pulley 8 and a tension pulley 9 is provided to switch the chain among the plurality of freewheel sprockets.

It is desirable to increase the number of sprockets, particularly in the rear freewheel, to provide the bicyclist with a greater choice of gears. However, the amount of lateral space in which to mount the chainwheel and/or freewheel is limited by the design of the bicycle and accepted design standards. Thus, in order to fit more sprockets into the available space, it is usually necessary to decrease the spacing between the adjacent sprockets. On the other hand, the minimum spacing between adjacent sprockets is limited by the width of the chain.

FIG. 2 is a top view of a segment of the conventional chain 4. A typical chain has pairs of outer links 10A and 10B which alternate with pairs of inner links 11A and 11B, wherein each pair of outer links 10A and 10B is connected to a corresponding pair of inner links 11A and 11B using a press-fit connecting pin 12. More specifically, the ends of each outer link 10A and 10B and the ends of each inner link 11A and 11B have openings for receiving connecting pin 12 therethrough. The corresponding ends of one pair of outer links 10A and 10B are aligned with the ends of an associated pair of inner links 11A and 11B, with the inner links 11A and 11B disposed laterally inwardly of the outer links 10A and 10B, so that the openings in the ends are aligned with each other. The ends of inner links 11A and 11B include flange sections 11C and 11D which abut each other and define the openings of inner links 11A and 11B. A roller 13 is disposed between the pair of inner links 11A and 11B and is rotatably supported by flange sections 11C and 11D. The connecting pin 12 passes through the opening in each link end 10A, 10B, 11A, and 11B such that the connecting pin 12 is press fit in the outer link ends 10A and 10B.

The lateral width of a typical chain 4 thus equals the top width of two outer links 10A and 10B plus the top width of two inner links 11A and 11B plus the width of the roller 13 (which is approximately equal to the width of the flange sections 11C and 11D). As a result, the number of sprockets in the multiple freewheel assembly is limited accordingly. More specifically, the minimum spacing between adjacent sprockets is equal to the thickness of one inner chain plate plus the thickness of one outer chain plate plus the thickness of the laterally projecting portion of the connecting pin plus a small free area to avoid binding of the chain, the sum of which is approximately equal to 2.8 millimeters.

SUMMARY OF THE INVENTION

The present invention is directed to a bicycle drive mechanism which includes a large number of freewheel sprockets, for example, ten or more and preferably fourteen freewheel sprockets. A very narrow chain may be used with the freewheel sprocket cluster to maximize the number of sprockets which can be mounted together.

In one embodiment of the present invention, a plurality of sprockets are coaxially mounted together, wherein a spacing between each pair of adjacent sprockets is less than a thickness of at least one of the plurality of sprockets. In another embodiment of the invention, a plurality of sprockets are coaxially mounted together, wherein a spacing between each pair of adjacent sprockets is less than or equal to approximately 2.0 millimeters. In yet a further embodiment of the present invention, at least ten sprockets are coaxially mounted together to form a first free side sprocket surface facing laterally outwardly and a second free side sprocket surface facing laterally inwardly. A spacing between the first free side sprocket surface and the second free side sprocket surface is less than or equal to approximately 50 millimeters.

In all such embodiments, the sprocket cluster may include a mounting member having a plurality of arms radially extending from a centrally located boss. A first sprocket may be formed as one piece with the mounting member and disposed at the radially outward ends of the plurality of radially extending arms, and a plurality of second sprockets may be mounted to the plurality of radially extending arms coaxially with the first sprocket. If desired, the mounting member may include a plurality of ledges, wherein each second sprocket is mounted on one of the plurality of ledges. A plurality of third sprockets may be mounted to the mounting member so that the third sprockets extend laterally outwardly relative to an outer lateral side surface of the boss. The boss also may include an inner lateral side surface disposed laterally outwardly relative to the first sprocket so that the sprocket cluster may be mounted to a hub such that at least the first sprocket is positioned laterally inwardly of an outer side surface of one of the hub flanges.

The sprocket cluster may be used together with a very narrow chain which accommodates the narrow spacing of the sprockets. Such a chain may include a plurality of intermediate links, a plurality of pairs of outer links, and a plurality of fasteners. Each fastener connects an end of one of the plurality of intermediate links between a corresponding pair of outer links so that the plurality of intermediate links alternate with the plurality of pairs of outer links. Each intermediate link defines a recess between each end thereof for receiving a sprocket tooth therein so that each intermediate link performs the function normally performed by the roller and corresponding pair of inner links in a conventional chain.

DETAILED DESCRIPTION OF THE EMBODIMENTS

Sprocket Cluster

Figure 12:
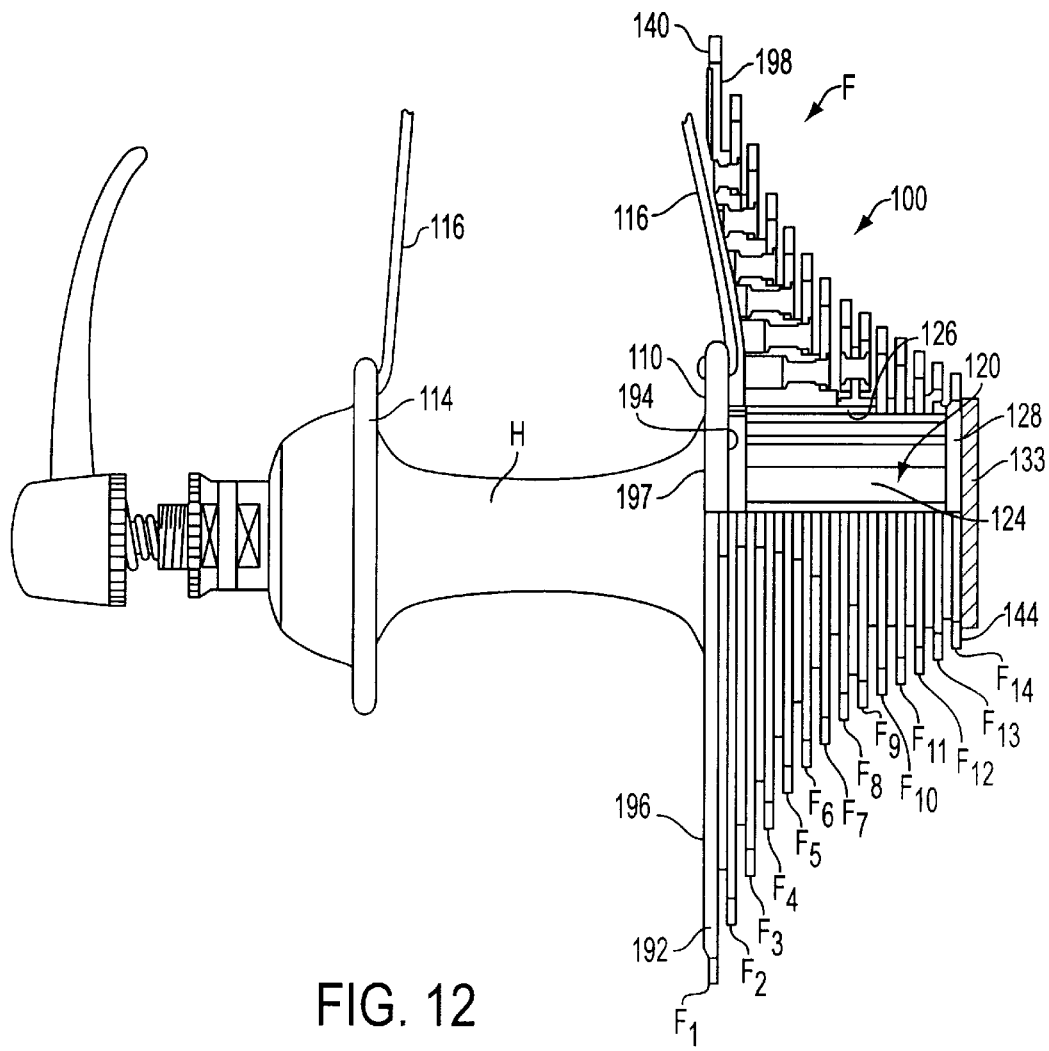
FIG. 12 is a rear view of a particular embodiment of a sprocket cluster according to the invention attached to a hub.

FIG. 12 is a partial cross sectional rear view of a particular embodiment of a multiple sprocket cluster 100 according to the invention. In this embodiment, sprocket cluster 100 includes at least ten, e.g., fourteen sprockets $F_1$ through $F_{14}$. Sprocket cluster 100 is part of freewheel assembly F which, in turn, is part of a hub assembly H. Hub assembly H includes flanges 110 and 114, both of which are connected to spokes 116 in a known manner. Spokes 116 connect the hub assembly to a wheel rim (not shown). In this embodiment, freewheel assembly F includes a mounting cylinder 120 having splines 124 on an outer peripheral surface thereof for engaging corresponding splines 126 formed on the inner peripheral surfaces of sprocket cluster 100, and a free end of mounting cylinder 120 includes a threaded portion 128 on an inner peripheral surface thereof which engages a threaded outer peripheral surface 132 of a lock ring 133 to fix sprocket cluster 100 on mounting cylinder 120.

In this embodiment, sprocket cluster 100 has a total width of less than or equal to approximately 50 millimeters. More specifically, sprocket cluster 100 has a total width of less than or equal to approximately 47 millimeters, such as 46.42 millimeters, between a free side 140 of sprocket $F_1$ and a free side 144 of sprocket $F_{14}$. This may be accomplished in part by forming some, if not all, of the sprockets $F_1$–$F_{14}$ with a thickness less than or equal to approximately 2 millimeters (at least the outer peripheral portions thereof, if not the entire sprocket). In this embodiment, sprockets $F_1$–$F_{14}$ may have a thickness less than or equal to approximately 1.8 millimeters, such as 1.76 millimeters. Sprocket $F_4$ may be formed thicker than the other sprockets to accommodate the forces resulting from high speed operation of the bicycle. Furthermore, a spacing between adjacent pairs of sprockets may be, for example, less than the thickness of at least one of the sprockets $F_1$–$F_{14}$. Between a larger diameter sprocket and a smaller diameter sprocket, the spacing may be measured between the root circle of the smaller diameter sprocket (e.g., at the area labeled R in FIG. 13) and the axially aligned portion of the larger diameter sprocket. The spacing also could refer to the portions of the smaller diameter sprocket above the root circle and the axially overlapping portions of the larger diameter sprocket. In this embodiment, a spacing between each pair of adjacent sprockets (using at least one of the two methods) is less than the thickness of each sprocket $F_1$–$F_{14}$, and it may be, for example, 1.66 millimeters. The minimum spacing is limited by the thickness of the outer link of the chain which, in this embodiment, is 0.9 millimeters. Regardless of the measurement method employed, there is at least some free space (e.g., 0.9 millimeters) between the root circle portions R of the smaller diameter sprocket and the axially aligned portion of the larger diameter sprocket.

Figure 13:
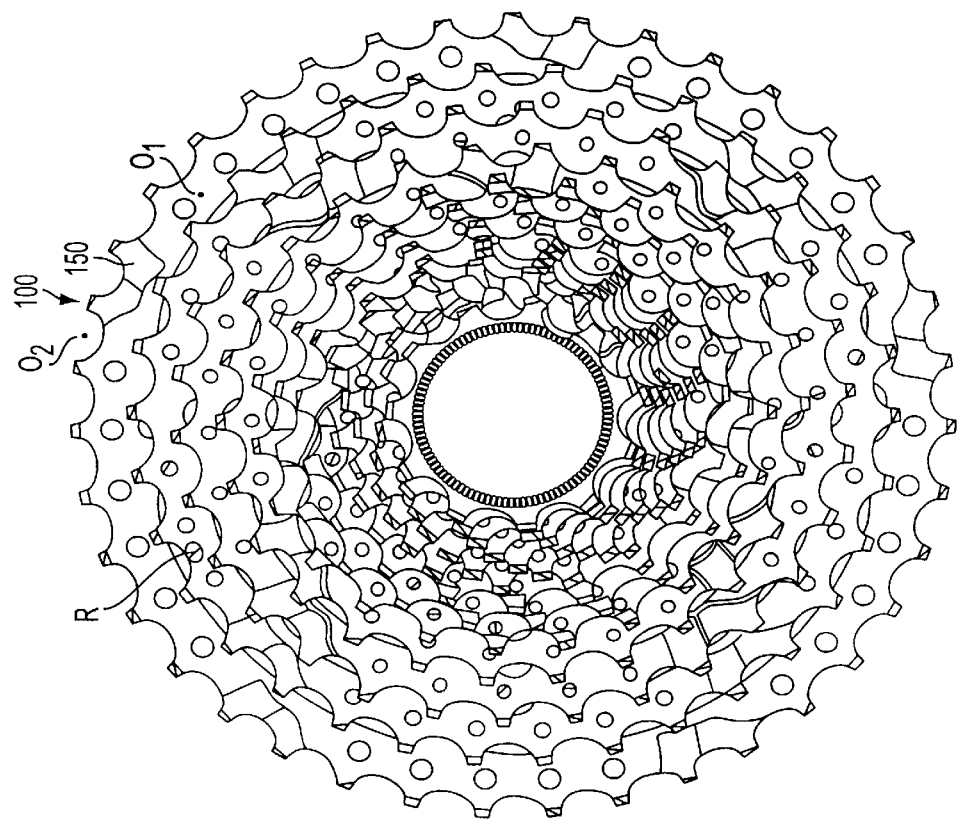
FIG. 13 is a side view of a particular embodiment of the sprocket cluster shown in FIG. 12.

FIG. 13 is a side view of sprocket cluster 100. In this embodiment, sprockets $F_1$–$F_{14}$ are structured and positioned according to the teachings of U.S. Pat. No. 4,889,521, incorporated herein by reference. That is, a center point $O_1$ between a pair of adjacent teeth on a smaller sprocket and a center point $O_2$ between a pair of adjacent teeth on the next larger sprocket, positioned on an approximate tangent extending along a chain path when a chain is being shifted from the smaller diameter sprocket to the larger diameter sprocket, is equal to an integer multiple of the chain pitch. Furthermore, chain guide portions 150 are provided at the inside surface of the larger diameter sprocket at a position along the chain path between the center points $O_1$ and $O_2$. Many such structures are provided on the various sprockets $F_1$–$F_{14}$.

Figure 14:
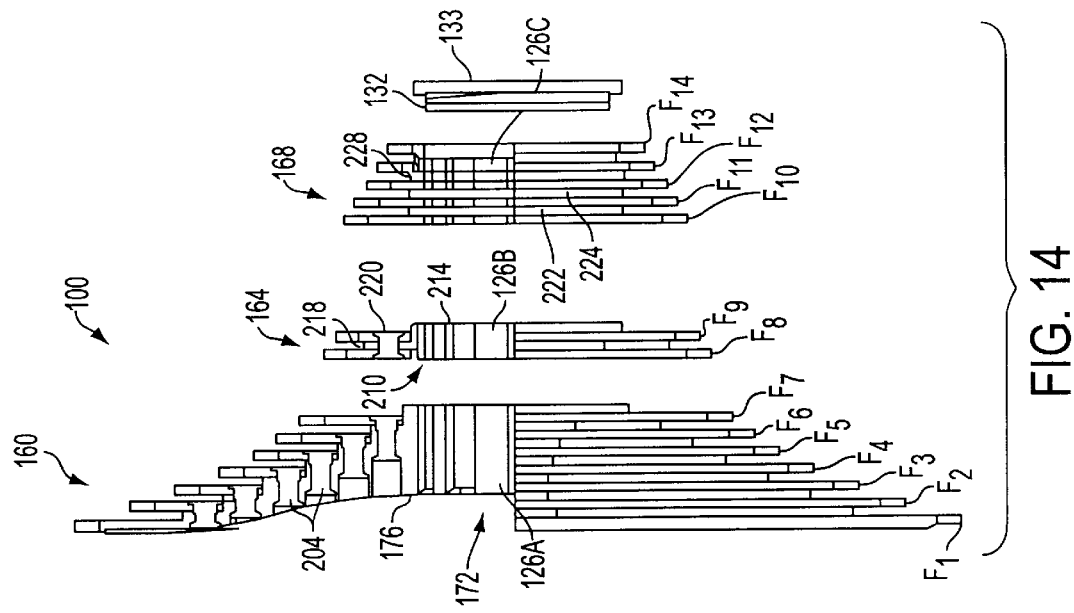
FIG. 14 is an exploded view of the sprocket cluster shown in FIG. 12.

FIG. 14 is an exploded view of cluster 100 showing how sprocket cluster 100 comprises three sub-clusters 160, 164 and 168. Sub-cluster 160 includes sprockets $F_1$–$F_7$; sub-cluster 164 includes sprockets $F_8$—$F_9$, and sub-cluster 168 includes sprockets $F_1$–$F_{14}$.

Figure 16:
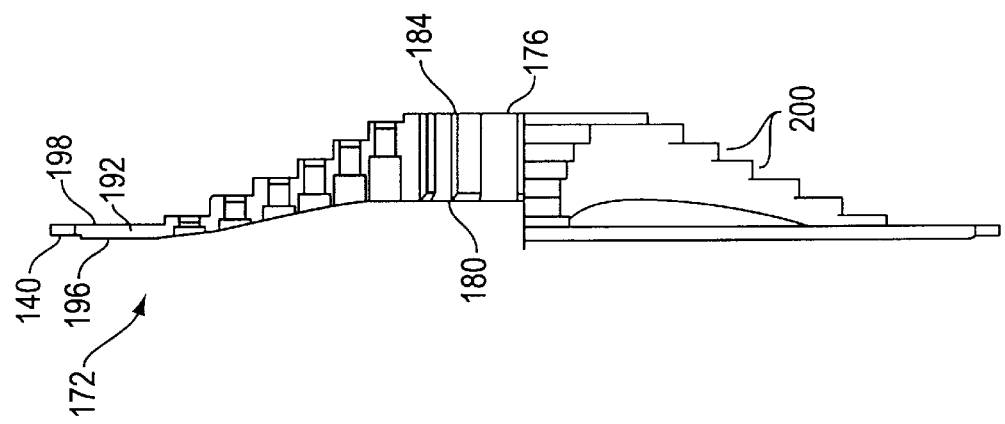
FIG. 16 is a partial cross sectional view of the mounting member shown in FIG. 15.
Figure 15:
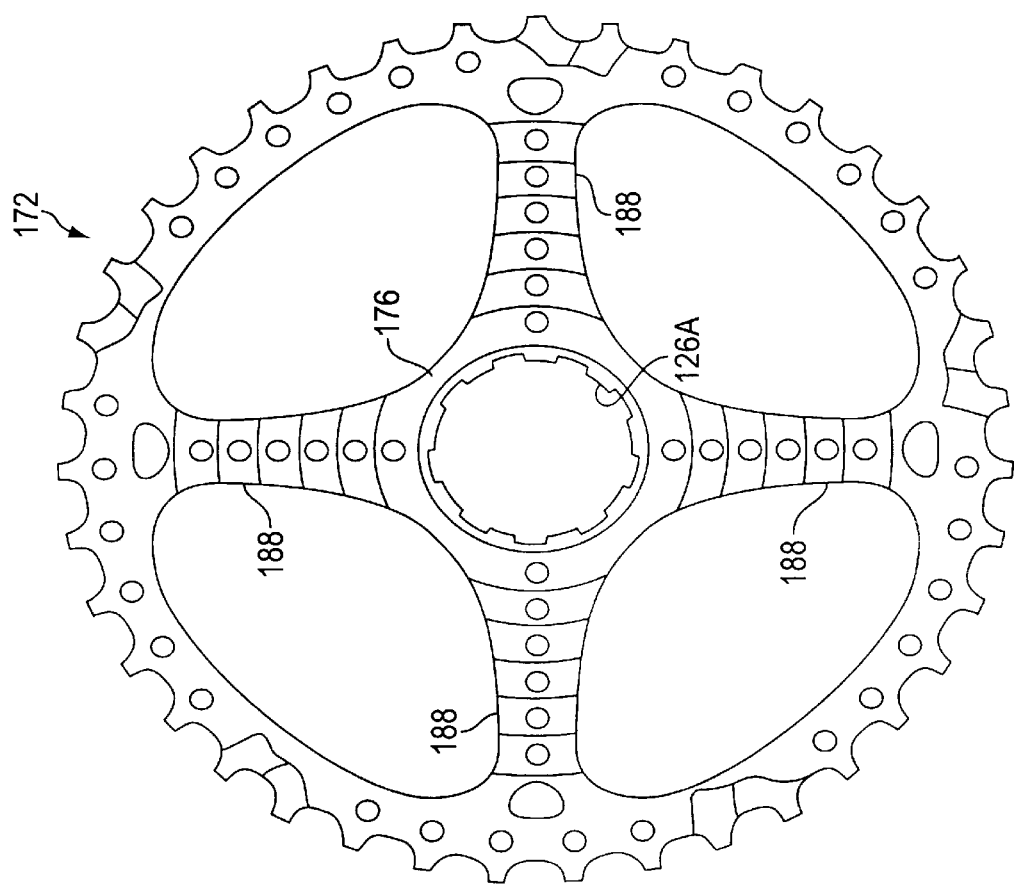
FIG. 15 is a side view of a particular embodiment of a mounting member used in the sprocket cluster shown in FIG. 12.

Sub-cluster 160 includes a mounting member 172 that is shown more clearly in FIGS. 15 and 16. Mounting member 172 includes a boss 176 having an inner lateral surface 180 and an outer lateral surface 184. As used herein, the terms "inner lateral" and "outer lateral" are defined according to the views shown in FIGS. 12 and 16, wherein the inner lateral direction is located toward the center of hub assembly H in FIG. 12. A plurality, e.g., four, arms 188 extend radially outwardly from boss 176 in a laterally inward direction as shown in FIGS. 14 and 16. In this embodiment, sprocket $F_1$ is formed as one piece with mounting member 172 and is disposed at the radially outward ends of the arms 188. Sprocket $F_1$ includes a thickened portion 192 located below side 140 to strengthen the sprocket and provide additional rigidity to mounting member 172. Thickened portion 192 may be, for example, 2.5 millimeters. Each arm 188 includes a plurality of ledges 200, wherein each sprocket $F_2$–$F_7$ is mounted on a corresponding ledge 200 and is secured to mounting member 176 through bolts or rivets 204 (FIG. 14). Splines 126A are formed on the inner peripheral surface of boss 176 for engaging splines 124 on mounting cylinder 120.

As shown more clearly in FIG. 16, mounting member 172 has a generally concave cross sectional shape such that inner lateral surface 180 of boss 176 is disposed laterally outwardly relative to a lateral inner surface 196 of the thickened portion 192 of sprocket $F_1$. Thus, when sprocket cluster 100 is mounted to hub assembly H, sprocket $F_1$ may be located laterally inwardly of an outer side surface 194 of hub flange 110 as shown in FIG. 12. If desired, the entire hub flange 110 may be disposed laterally outwardly of the lateral inner surface 196 of thickened portion 192, or else an inner side surface 197 of hub flange 110 may be aligned with the lateral inner surface 196 of thickened portion 192. If so, the concave portion of mounting member 172 may be shaped so as not to interfere with spokes 116.

Sub-cluster 164 includes a mounting member 210 having a boss 214 and radially extending arms 218. Unlike arms 188 in mounting member 172, arms 218 extend radially straight outward. Sprockets $F_8$ and $F_9$ are mounted to arms 218 through bolts or rivets 220. Splines 126B are formed on the inner peripheral surface of boss 214 for engaging splines 124 on mounting cylinder 120 so that sprockets $F_8$ and $F_9$ are disposed laterally outwardly of the outer lateral surface 184 of mounting member 172.

Sub-cluster 168 comprises sprockets $F_{10}$–$F_{14}$, wherein sprockets $F_1$–$F_{12}$ are separated from each other through spacers 222 and 224. Splines 126C are formed in the inner lateral surfaces of sprockets $F_{10}$–$F_{14}$ and spacers 222 and 224 for engaging splines 124 on mounting cylinder 120. Sprocket $F_{13}$ includes a laterally bent portion 228 which separates the radially extending portion of sprocket $F_{13}$ from sprocket $F_{12}$, and sprocket $F_{14}$ includes a laterally bent portion 232 which seats within the laterally bent portion of sprocket $F_{13}$ and separates the radially extending portion of sprocket $F_{14}$ from sprocket $F_{13}$.

Chain

Figure 1:
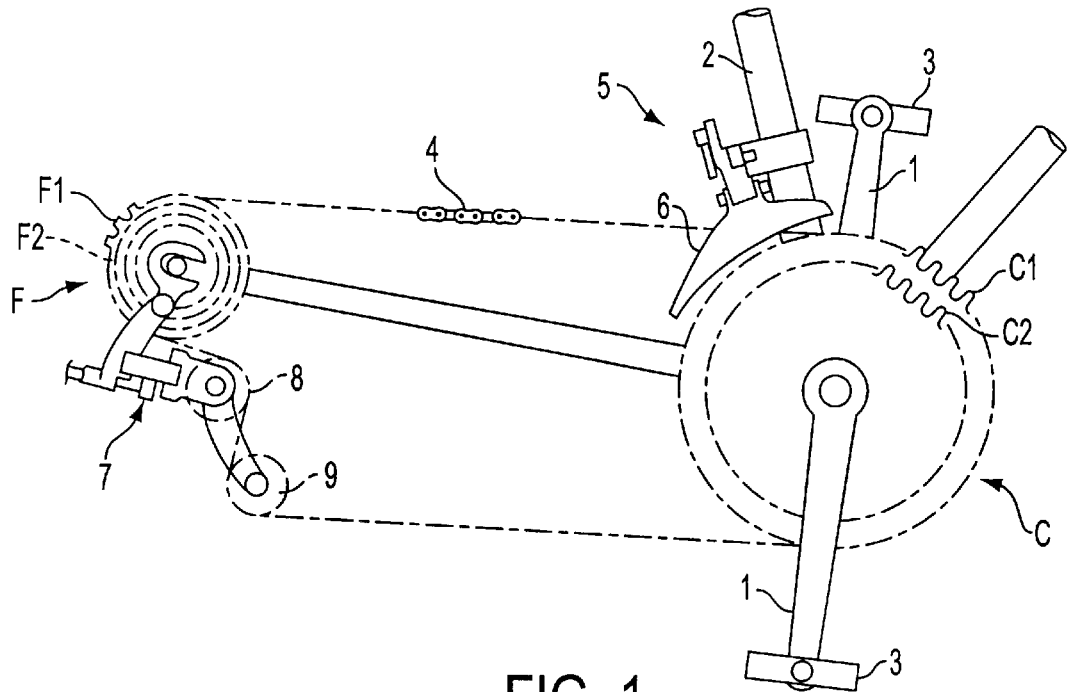
FIG. 1 is a diagram illustrating a typical bicycle chain drive mechanism.
Figure 2:
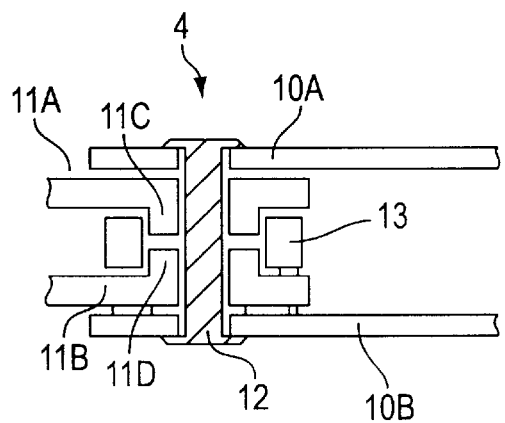
FIG. 2 is a top view of a typical bicycle chain.
Figure 3:
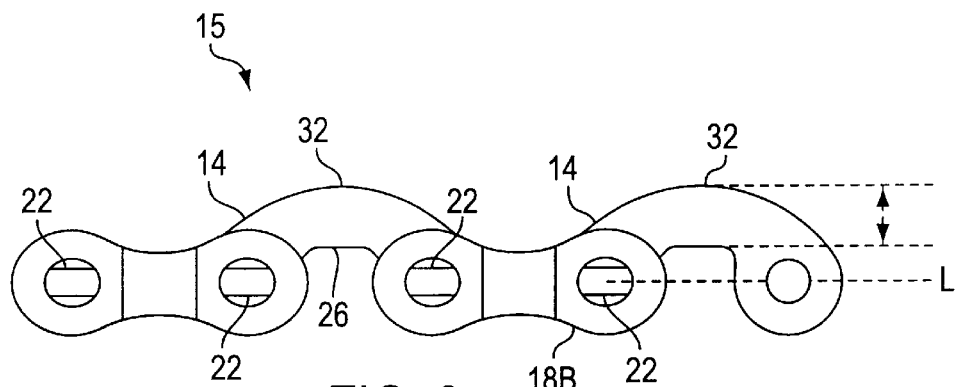
FIG. 3 is a side view of a particular embodiment of a bicycle chain used with a sprocket cluster according to the present invention.
Figure 4:
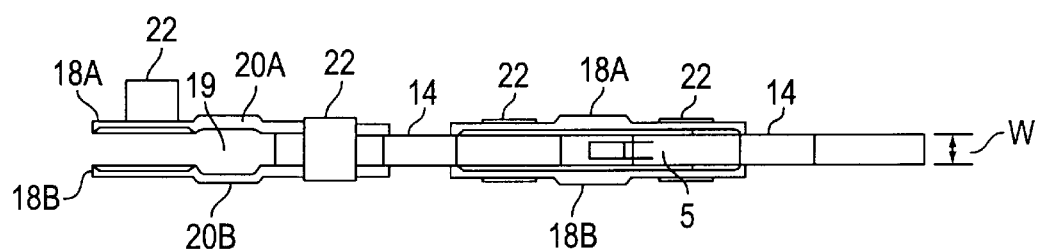
FIG. 4 is a top view of the bicycle chain shown in FIG. 3.

FIG. 3 is a side view, and FIG. 4 is a top view, of a particular embodiment of a bicycle chain 15 which may be used with sprocket cluster 100. As shown in those figures, bicycle chain 15 includes a plurality of intermediate links 14, a plurality of pairs of outer links 18A and 18B, and a plurality of fasteners (e.g., connecting pins) 22. Each fastener 22 connects an end of one of the plurality of intermediate links 14 between a corresponding pair of outer links 18A, 18B so that the plurality of intermediate links 14 alternate with the plurality of pairs of outer links 18A, 18B. In this embodiment, each intermediate link 14 is a single solid member having a generally uniform width W, wherein the width W of each end of the plurality of intermediate links 14 defines a spacing between its corresponding pair of outer links 18A, 18B. Preferably, the width W of each end is approximately equal to a thickness S of the engaged sprocket tooth. Furthermore, a cross sectional thickness T of each intermediate link is greater than the width W of the link. Thus, each intermediate link 14 has a generally thin and flat plate shape. In this embodiment, there are no other structures disposed between the ends of the intermediate links 14 and the ends of the corresponding pair of outer links 18A and 18B. In fact, the entire chain 15 is made up of only the intermediate links 14, the pairs of outer links 18A, 18B and the fasteners 22 as shown. The ends of the intermediate links 14 may contact the ends of the corresponding pair of outer links 18A, 18B, or there may be a small space between the ends of the intermediate links 14 and the ends of the corresponding pair of outer links 18A, 18B.

The outer link plates 18A and 18B are thin plates which are spaced apart from each other to define a space 19 for receiving a sprocket tooth therein. Outer link plate 18A includes a laterally curved intermediate portion 20A which curves away from outer link plate 18B, and outer link plate 18B includes a similar laterally curved intermediate portion 20B which curves away from outer link plate 18A. Laterally curved portions 18A and 18B help the sprocket tooth catch the chain during shifting.

Figure 5:
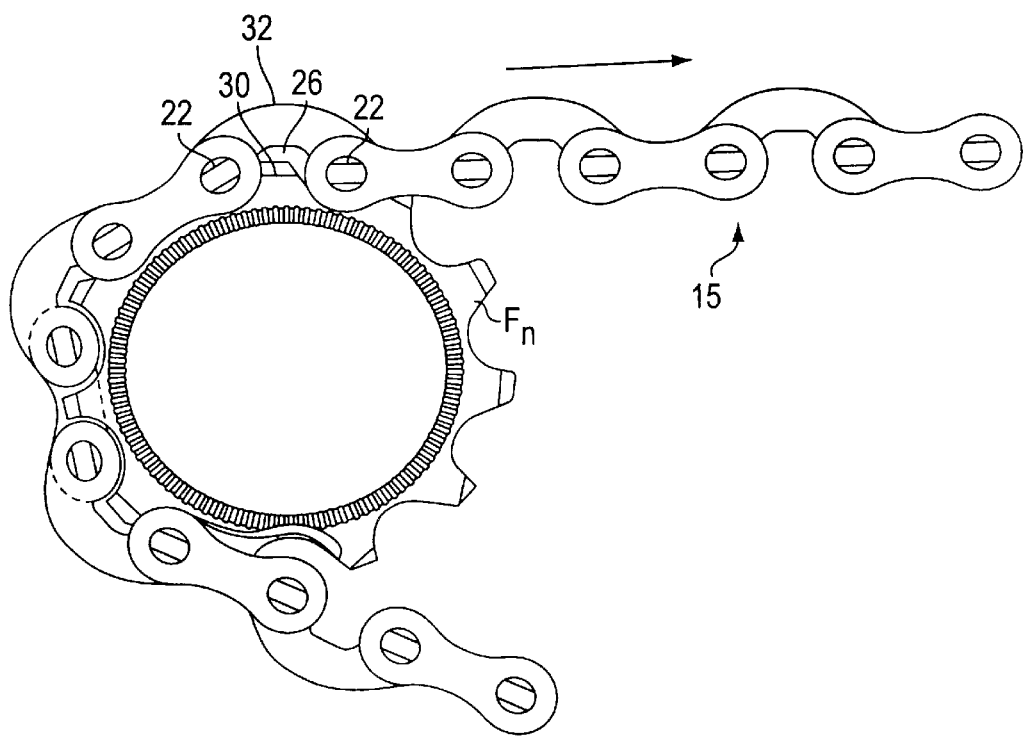
FIG. 5 is a side view of the bicycle chain shown in FIG. 3 engaging a sprocket.

As shown in FIGS. 3 and 5, each intermediate link 14 defines a recess 26 between each end thereof for receiving a sprocket tooth therein. FIG. 5 shows the example of chain 15 engaging a tooth 30 of a freewheel sprocket $F_n$ (e.g., sprocket $F_{14}$ of sprocket cluster 100), but the same applies when the chain engages one of the chainwheels. In this embodiment, recess 26 extends between the fasteners 22 at each end of the intermediate link 14 such that a phantom line L connecting the fasteners 22 at each end of each intermediate link 14 (e.g., the center point of each fastener) intersects the recess 26 therebetween. This allows each connecting pin 22 to be sandwiched between adjacent pairs of sprocket teeth. To accommodate recess 26 without compromising the strength of the link, the upper surface 32 of each intermediate link may be convex shaped.

Figure 6:
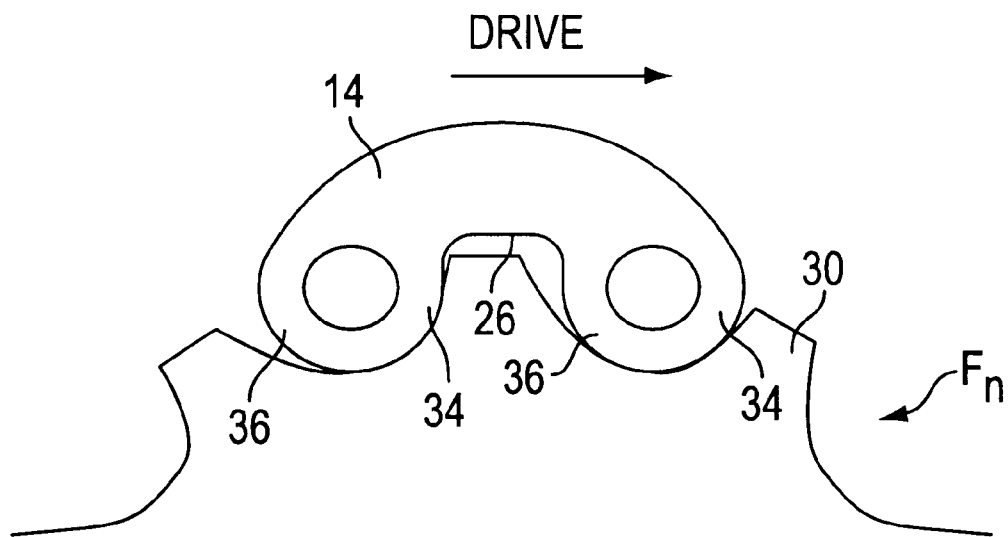
FIG. 6 is a detailed view showing how the bicycle chain shown in FIG. 3 engages a freewheel sprocket.
Figure 7:
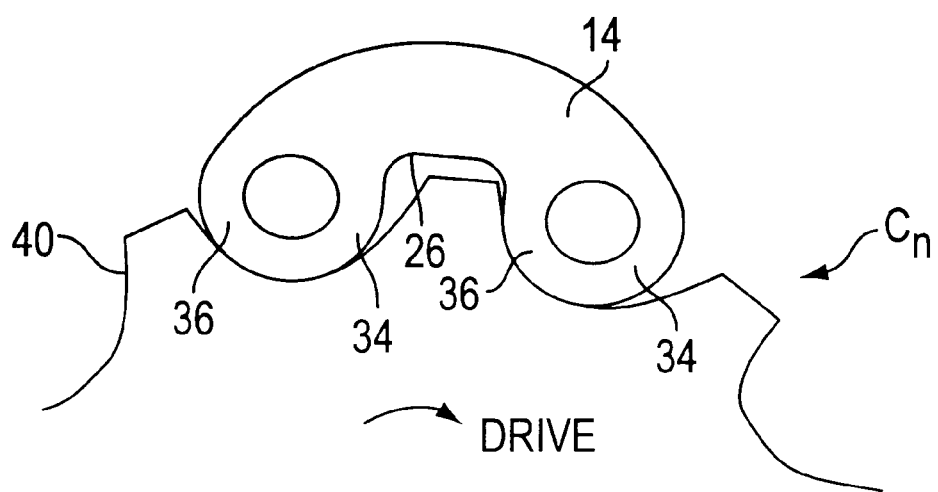
FIG. 7 is a detailed view showing how the bicycle chain shown in FIG. 3 engages a chainwheel sprocket.

FIG. 6 is a detailed view showing how the bicycle chain 15 engages a freewheel sprocket $F_n$, and FIG. 7 is a detailed view showing how the bicycle chain 15 engages a chainwheel sprocket $C_n$. Because of the position of recess 26 relative to the ends of each intermediate link 14, drive faces 34 and 36 are formed at each intermediate link 14. Since the rear wheel of the bicycle resists the drive force of the chain, drive faces 34 of each intermediate link 14 press against the rear surface of each freewheel sprocket tooth 30 as shown in FIG. 6. This resistance, in turn, causes chain 15 to resist the rotation of the chainwheels. As a result, the front face of each chainwheel tooth 40 presses against drive faces 36 as shown in FIG. 7. Drive faces 34 and 36 thus perform the function performed by the roller in conventional chains. Also, since each fastener 22 is sandwiched between pairs of adjacent sprocket teeth, stable contact of each drive face and reliable driving of the chain is obtained. To further enhance the performance of the chain, drive faces 34 and 36 may be contoured to match the rear and front surfaces, respectively, of the teeth they contact.

Figure 8:
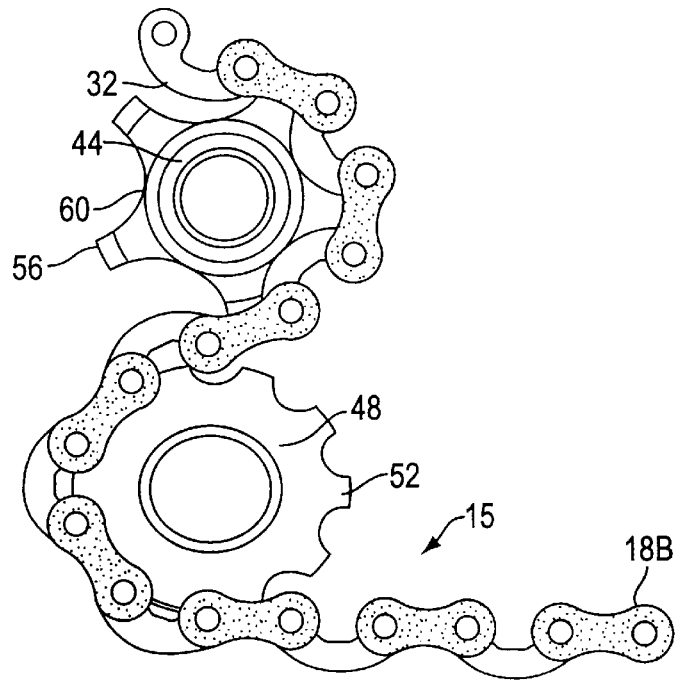
FIG. 8 is a detailed view illustrating an embodiment of derailleur guide and tension pulleys which may be used with the chain shown in FIG. 3.

FIG. 8 is a detailed view illustrating an embodiment of a derailleur guide pulley 44 and a derailleur tension pulley 48 which may be used with chain 15. Tension pulley 48 may be constructed in the usual way such that a tension pulley tooth 52 projects into each space between adjacent fasteners 22 in chain 15. However, because each intermediate link 14 in this embodiment has a convex surface 32 which does not accommodate sprocket teeth, guide pulley 44 has fewer sprocket teeth 56 so that sprocket teeth 56 project only into the space defined by each pair of outer links 18A and 18B. Guide pulley 44 has convex surfaces 60 for receiving the concave surfaces 32 of the plurality of intermediate links 14.

Figure 9:
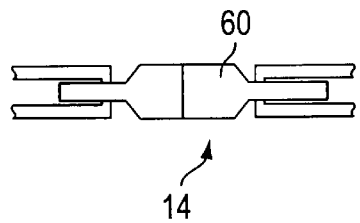
FIG. 9 is a top view of an alternative embodiment of an intermediate link which may be used in the bicycle chain.

FIG. 9 is a top view of an alternative embodiment of an intermediate link 14 which may be used in bicycle chain 15. In this embodiment, a middle portion 60 of each link 14 is wider than the end portions to increase the strength of the link.

Figures 10A, 10B:
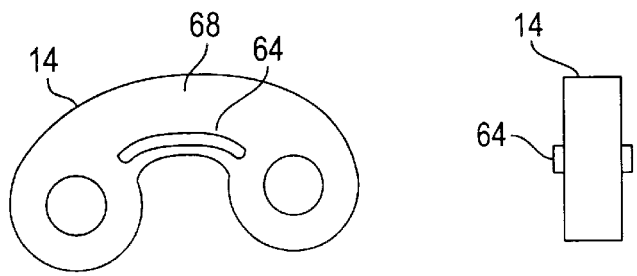
FIGS. 10A and 10B are side and rear views, respectively, of another alternative embodiment of an intermediate link which may be used in the bicycle chain.

FIGS. 10A and 10B are side and rear views, respectively, of another alternative embodiment of an intermediate link 14 which may be used in bicycle chain 15. In this embodiment, a rib 64 projects laterally from a middle portion 68 of each link 14 to increase the strength of the link.

Figure 11:
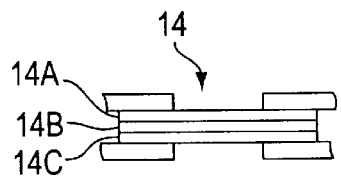
FIG. 11 is a top view of another alternative embodiment of an intermediate link which may be used in the bicycle chain.

FIG. 11 is a top view of another alternative embodiment of an intermediate link 14 which may be used in bicycle chain 15. In this embodiment, intermediate link 14 comprises a plurality of intermediate link plates 14A, 14B and 14C. The number of link plates may be varied according to the application.

While the above is a description of various embodiments of the present invention, further modifications may be employed without departing from the spirit and scope of the present invention. For example, the size, shape and orientation of the components may be changed as desired. Sprocket $F_1$ may be formed separately from mounting member 172, and different types of fasteners may be used in chain 15. Mounting member 172 could be formed as a frustoconical disc, and the thickness of each sprocket in sprocket cluster 100 may be nonuniform. There may be a thin friction bushing between the ends of the intermediate links 14 and the ends of the corresponding pair of outer links 18A and 18B, and the intermediate link 14 need not have a convex upper surface. One of the drive faces 34 or 36 of chain 15 may be omitted. The teeth in sprocket cluster 100 may be modified as desired and may include reduced height teeth or omitted teeth. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the figures by such labeling.

What is claimed is:

1. A chain and a sprocket cluster in combination for use in a bicycle transmission,
    wherein the chain comprises:
    a plurality of intermediate links;
    a plurality of pairs of outer links;
    a plurality of fasteners, wherein each fastener connects an end of one of the plurality of intermediate links between a corresponding pair of outer links so that the plurality of intermediate links alternate with the plurality of pairs of outer links;
    wherein each intermediate link includes a reinforcing rib extending along an intermediate portion thereof between a pair of the plurality of fasteners;
    wherein each intermediate link defines a longitudinal bottom recess between each end thereof for receiving a sprocket tooth therein, the recess extending between the fasteners at each end of the intermediate link;
    wherein each pair of outer links comprises first and second outer link plates facing each other, wherein each outer link plate includes a laterally curved middle portion, wherein the laterally curved middle portion of the first outer link plate curves away from the second outer link plate, and wherein the laterally curved middle portion of the second outer link plate curves away from the first outer link plate; and
    wherein the sprocket cluster comprises:
        a plurality of sprockets coaxially mounted together, each sprocket including a plurality of teeth for engaging the chain so that a sprocket tooth extends into the recess of each intermediate link engaging the sprocket.

2. The apparatus according to claim 1 wherein a spacing between each pair of adjacent sprockets is less than or equal to a thickness of at least one of the plurality of sprockets.

3. The apparatus according to claim 2 wherein the spacing between each pair of adjacent sprockets is less than or equal to the thickness of each of the plurality of sprockets.

4. The apparatus according to claim 1 wherein a spacing between each pair of adjacent sprockets is less than or equal to approximately 2.0 millimeters.

5. The apparatus according to claim 1 wherein the plurality of sprockets comprises at least ten sprockets.

6. The apparatus according to claim 5 wherein the plurality of sprockets are coaxially mounted together and form a first free side sprocket surface facing laterally outwardly and a second free side sprocket surface facing laterally inwardly, wherein a spacing between the first free side sprocket surface and the second free side sprocket surface is less than or equal to approximately 50 millimeters.

7. A chain and a sprocket cluster in combination for use in a bicycle transmission, wherein the chain comprises:
    a plurality of intermediate links;
    a plurality of pairs of outer links;
    a plurality of fasteners, wherein each fastener connects an end of one of the plurality of intermediate links between a corresponding pair of outer links so that the plurality of intermediate links alternate with the plurality of pairs of outer links;
    wherein each intermediate link defines a longitudinal bottom recess between each end thereof for receiving a sprocket tooth therein, the recess extending between the fasteners at each end of the intermediate link; and
    wherein the sprocket cluster comprises:
        a plurality of sprockets including at least ten sprockets coaxially mounted together in an axially immovable position relative to each other, each sprocket including a plurality of teeth for engaging the chain so that a sprocket tooth extends into the recess of each intermediate link engaging the sprocket, wherein a free space is disposed between a free side sprocket surface of a smaller diameter sprocket and an axially aligned free side sprocket surface of a larger diameter sprocket for each pair of adjacent sprockets, wherein the free side sprocket surface of each smaller diameter sprocket faces the free side sprocket surface of the larger diameter sprocket adjacent to it, and wherein the free space between each pair of adjacent sprockets is less than or equal to a thickness of at least one of the plurality of sprockets.

8. The apparatus according to claim 7 wherein the free space between each pair of adjacent sprockets is less than or equal to the thickness of each of the plurality of sprockets.

9. The apparatus according to claim 7 wherein the free space between each pair of adjacent sprockets is less than or equal to approximately 2.0 millimeters.

10. The apparatus according to claim 9 wherein the free space between each pair of adjacent sprockets is less than or equal to approximately 1.8 millimeters.

11. The apparatus according to claim 7 wherein the plurality of sprockets form a first free side sprocket surface facing laterally outwardly and a second free side sprocket surface facing laterally inwardly, wherein a spacing between the first free side sprocket surface and the second free side sprocket surface is less than or equal to approximately 50 millimeters.

12. A chain and a sprocket cluster in combination for use in a bicycle transmission, wherein the chain comprises:
    a plurality of intermediate links;
    a plurality of pairs of outer links;
    a plurality of fasteners, wherein each fastener connects an end of one of the plurality of intermediate links between a corresponding pair of outer links so that the plurality of intermediate links alternate with the plurality of pairs of outer links;
    wherein each intermediate link defines a longitudinal bottom recess between each end thereof for receiving a sprocket tooth therein, the recess extending between the fasteners at each end of the intermediate link; and wherein the sprocket cluster comprises:
a plurality of sprockets including at least ten sprockets coaxially mounted together in an axially immovable position relative to each other, each sprocket including a plurality of teeth for engaging the chain so that a sprocket tooth extends into the recess of each intermediate link engaging the sprocket, wherein a free space is disposed between a root circle portion of a smaller diameter sprocket an axially aligned portion of a larger diameter sprocket for each pair of adjacent sprockets, and wherein the free space between each pair of adjacent sprockets is less than or equal to a thickness of at least one of the plurality of sprockets.

13. The apparatus according to claim 12 wherein the free space between each pair of adjacent sprockets is less than or equal to the thickness of each of the plurality of sprockets.

14. The apparatus according to claim 12 wherein the free space between each pair of adjacent sprockets is less than or equal to approximately 2.0 millimeters.

15. The apparatus according to claim 14 wherein the free space between each pair of adjacent sprockets is less than or equal to approximately 1.8 millimeters.

16. The apparatus according to claim 12 wherein the plurality of sprockets form a first free side sprocket surface facing laterally outwardly and a second free side sprocket surface facing laterally inwardly, wherein a spacing between the first free side sprocket surface and the second free side sprocket surface is less than or equal to approximately 50 millimeters.

* * * * *